Feb. 5, 1935. L. NETTER 1,990,462
PROPELLING MECHANISM FOR AIRCRAFT AND THE LIKE
Filed Dec. 5, 1933 3 Sheets-Sheet 1
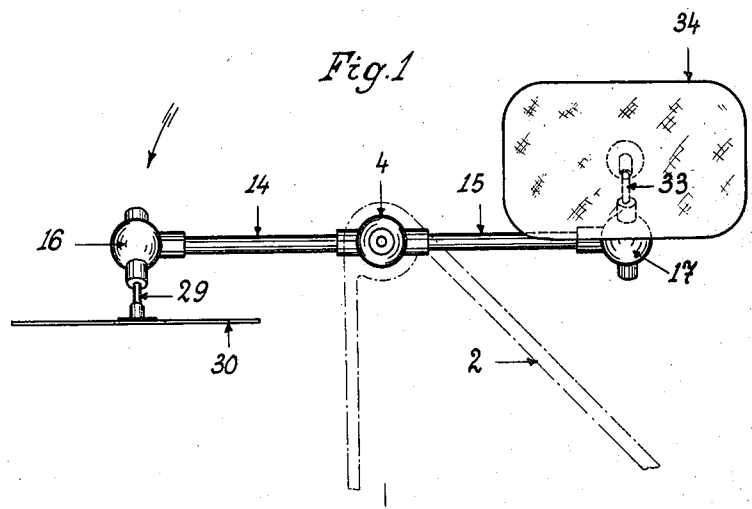
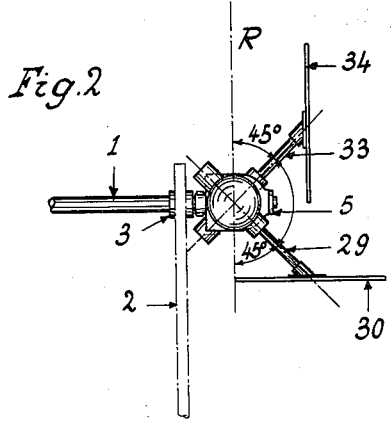
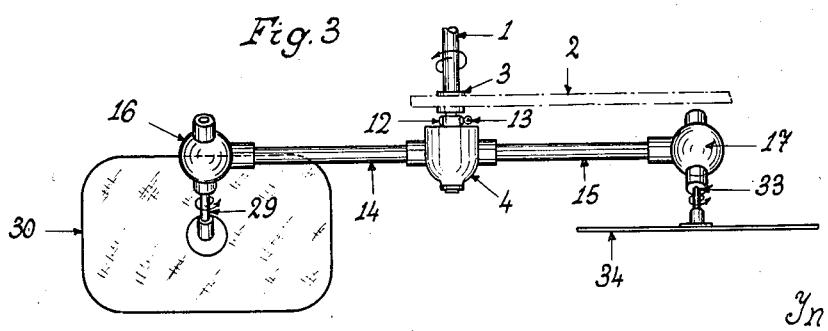
Inventor
Ludwig Netter
By Fredrick Blg
Attorney Feb. 5, 1935.  L. NETTER  1,990,462
PROPELLING MECHANISM FOR AIRCRAFT AND THE LIKE
Filed Dec. 5, 1933   3 Sheets-Sheet 2
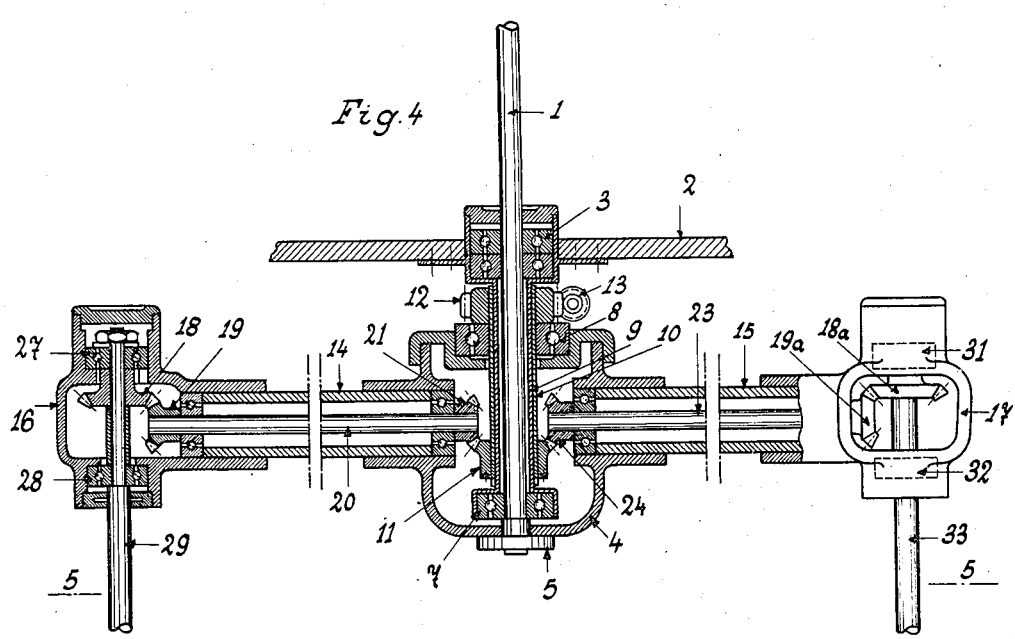
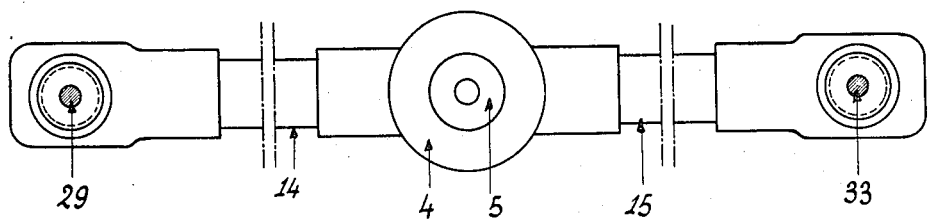
Inventor
Ludwig Netter
By Fredrick Bltg
Attorney

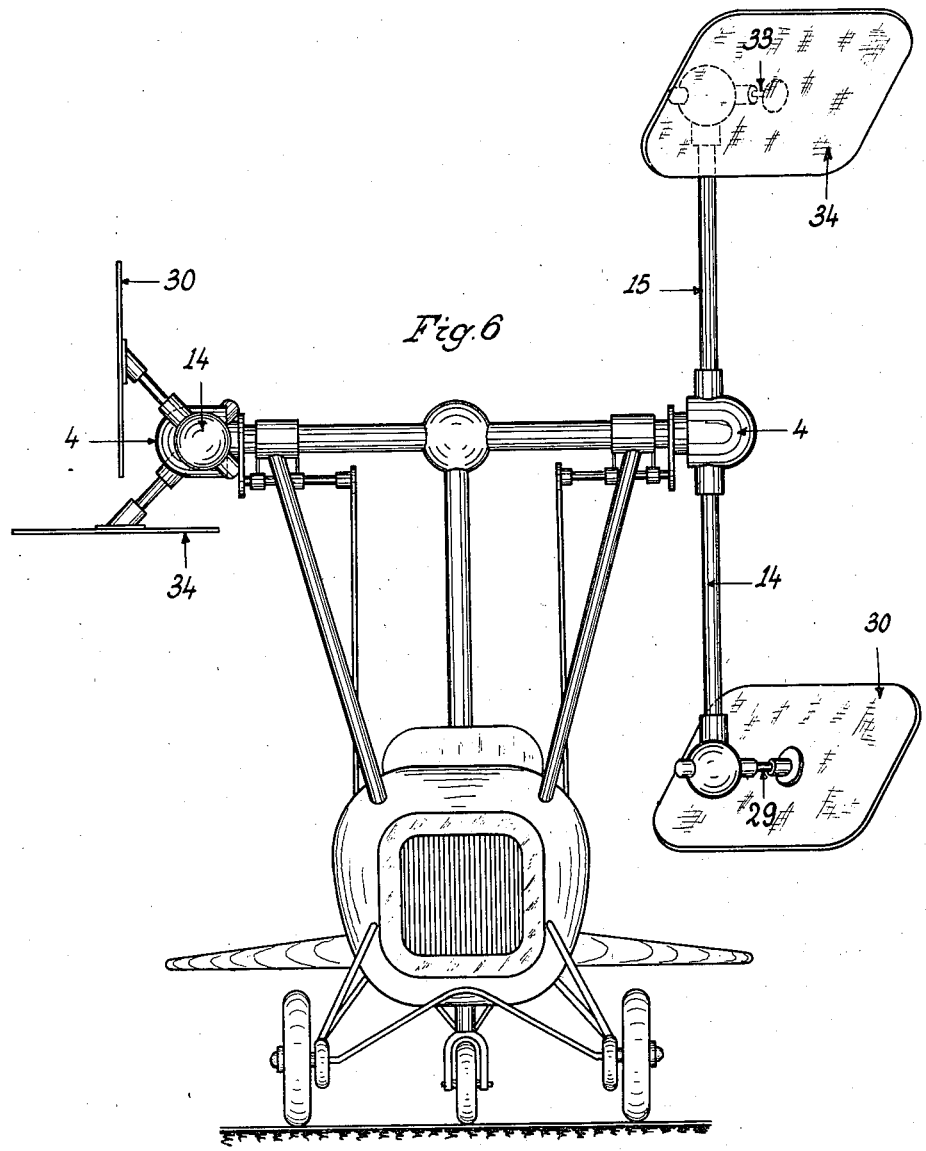

Patented Feb. 5, 1935

1,990,462

UNITED STATES PATENT OFFICE

1,990,462

PROPELLING MECHANISM FOR AIRCRAFT AND THE LIKE

Ludwig Netter, Otterstadt, near Speyer-on-the-Rhine, Germany, assignor of one-half to Franz Bueschler, Mannheim, Germany Application December 5, 1933, Serial No. 700,999 In Germany December 19, 1932

3 Claims. (Cl. 170—143)

This invention relates to improvements in devices for propelling craft of all kinds but more particularly aircraft and in which rotatable planes, blades or propeller members are employed. It is already known in aircraft to employ separate planes or propellers for vertical and for horizontal flight.

The propelling device or propeller according to the present invention is adapted for vertical or horizontal flying or for flight at any intermediate angle. Generally two similar propelling sets are provided for each craft, one on each side of the central longitudinal plane of the fuselage body. The plane of revolution of the propelling planes or blades is substantially parallel to the line of flight or the longitudinal axis of the body. These propelling blades are preferably arranged above the body of the craft and are rotatably mounted on the ends of supporting or radius arms which are themselves rotated by a motor driven shaft.

The propelling blades are in the form of planes and may be adjustably mounted on the ends of the radius arms. During each complete rotation of any radius arm, the corresponding blade is positively moved, as for instance by rotation about an axis of its own, in such a manner that at some point in the rotation of the radius arm the blade is perpendicular to the plane of rotation of the radius arm, whilst after half a revolution of the radius arm, the said blade is parallel to the plane of rotation of the arm and after a further half rotation of this arm the blade is again at right angles to the plane of rotation of the radius arm. At all intermediate points the blade is in inclined relation to the plane of rotation of the radius arm and such relation is herein referred to as a "wind-skew" relation. By providing means, operable by the pilot, for advancing or retarding the points in the rotation of the radius arm where the blade is vertical in respect to the plane of rotation of the arm, the required relation of the propelling blade for any desired direction of flight may be obtained. The driving shaft of the blade is preferably set at an angle of 45 degrees to the plane of rotation of the radius arm. It is generally preferred to employ in each propelling set two radius arms set at 180 degrees to one another these arms being hollow and having the transmission shafts for driving the blades passing therethrough and these transmission shafts are preferably arranged to rotate in opposite directions, the blades on the two opposite arms being so set that when one of said blades is in a plane parallel to the plane of rotation of the radius arm the other blade is at right angles thereto.

It is not essential to limit the number of blades and radius arms in any given propelling set to two. Also any desired number of propelling sets may be employed in a single craft and may be arranged thereon in a variety of ways. Further the propelling sets according to this invention may be used on aircraft with fixed supporting planes or with gyro-planes. In this way improved horizontal flight is obtained and it is still possible to glide with the propeller device undriven. Further the blades may be used to form a wind motor.

The invention is illustrated by way of example in the accompanying drawings in which is shown an air craft with two propelling sets in accordance with this invention and in these drawings:

Figure 1 is an elevation of a two arm propelling set looking on the plane of rotation of the radius arms.

Figure 2 is an end elevation of the same,

Figure 3 is a plan view of the same,

Figure 4 is a sectional plan view to an enlarged scale,

Figure 5 is a section on the line 5—5 of Figure 4,

Figure 6 is an elevation of the entire aircraft having two propelling sets mounted thereon in accordance with the present invention.

In carrying the invention into effect, a shaft 1 driven from any suitable source of power not shown, is mounted in a bearing 3 in the frame 2 and has fixed at its end by a flange 5 a housing or cap 4. Only one bearing is shown as this is all that is required to enable the invention to be understood. The cap 4 is running on one end on a bearing 7, at its other end on a bearing 8; the former is fixed to a hollow axle 9, which may be connected in some way to the frame 2 and at the same time may carry the bearing 3. The hollow axle 9 surrounds the corresponding end of the main shaft 1. The bearing 8 is fastened to a bush 10. Around the hollow shaft 9 there is this rotatable bush 10 which passes through the inner ring of the ball bearing 8 and has a bevel wheel 11 keyed to it within the cap 4 as well as a worm wheel 12 keyed to it outside the cap 4. With this worm wheel 12 there engages a worm 13 connected by suitable transmission to the pilot's cabin. The worm 12 and screw 13 retain the bush 10 fixed in any desired position so that it does not share in the rotation of the driving shaft 1 but may be rotated by the pilot in one or other direction and thereby alter the setting of the blades as hereafter explained.

The cap 4 has two hollow radius arms 14, 15 whose axes lie in a straight line, the radius arm 14 having at its end a casing or housing 16 and the radius arm 15 a housing 17. In the housing 16 there is a bevel gear 18, 19, the shaft 20 of the bevel gear 19 having at its other end a bevel wheel 21 which engages with the bevel wheel 11 on the bush 10. Within the radius arm 15 the bevel wheels 18a, 19a, 24 and shaft 23 are similarly arranged. A shaft 29 is supported in bearings 27, 28 and is keyed to the bevel wheel 18, whilst in the housing 17 the shaft 33 is keyed to the bevel wheel 18a and is supported in the bearings 31, 32.

On the end of the shaft 29, see Figures 1-3 there is fixed a propelling plane or blade 30 whilst at the end of shaft 33 there is fixed the blade 34. Driven by the shaft 1, the cap housing 4 and radius arms revolve, thereby causing the blades 30, 34 to move in a circular path with the axis of the shaft 1 as centre. The bevel wheels 21 and 24 during this revolution roll on the bevel wheel 11 which is held from rotation by the worm gear 12, 13. The shafts 20 and 23 within the radius arms 14 and 15 respectively are thereby caused to revolve in opposite directions and this movement is transmitted to the shafts 29 and 33 through the bevel wheels 18, 19 and 18a and 19a respectively. The ratio of the bevel gearing is so chosen that the shafts 29 and 33 make one complete turn for each revolution of the radius arms 14, 15.

The blades 30, 34 are at their centres fixed to the shafts 29 and 33 which are set at an angle of 45 degrees to the plane of rotation of the radius arms, but the two shafts, see Figure 2, are at the same time set at 90 degrees to one another. The blades 30, 34 are also fixed in inclined relation to the shafts 29, 33, the shafts being inclined at angles of 45 degrees to the plane of the blades in each case. In this way it will be seen that the normal from the centre of the blade, say blade 30, will at each revolution of the radius arms trace out the surface of a cone having an apex angle of 90 degrees about the central axis of the shaft 29. The same applies of course to the blade 34 and shaft 33.

The peculiar features of the present invention are most clearly defined by the following points:

If the shafts 29, 30 were not set in the skew relation above described and as illustrated, but lay, say, in the same horizontal plane as the plane of rotation of the radius arms, the blades would only move in their own plane during a revolution of the radius arms and thus only produce a churning action on the air, but there would not be any driving or lifting component. The wind skew position of the shafts 29, 33 to the plane of rotation of the radius arms, and more particularly the fact that they are oppositely set at 45 degrees, that is when considering the shafts on two radius arms which lie in line with one another, is a prominent feature of this invention. It should be noted that the plane of rotation of the radius arms 14, 15 may also be horizontal instead of the vertical plane illustrated, or in fact any intermediate inclined position may be chosen. Another peculiarity of the invention is that when the radius arms do not revolve the position of the blades or planes 30, 34 may be altered so that these blades may then perform the function of ailerons, guide planes or even tractor planes. This peculiarity of the invention may be expressed in the term "convertible planes" as applied to the blades 30, 34.

By operating the worm gearing 12, 13 the points in the revolution of the radius arms where these relative positions occur may be ascertained, thus the direction of fly will be controlled, as desired.

What I claim is:

1. A propelling device, especially for propelling aircraft, at least one blade, moving in a circular path, a rotating blade shaft, adjustably carrying the blade and having a wind-skew position to the blade, a rotating radius arm, adjustably carrying the blade shaft in a wind-skew position to the plane of rotation of the radius arm, a main shaft carrying the radius arm, means for operating the main shaft, means for operating the blade shaft and means for imparting to the blade shaft an additional rotative motion about its own axis.

2. In a propelling device, as claimed, the arrangement of the blade shafts at an angle of 45 degrees to the plane of the blades and the arrangement of the blade shafts at an angle of 45 degrees of the plane of rotation of the radius arms.

3. A propelling device, especially for propelling aircraft, comprising in combination at least one blade moving in a circular path, a rotating blade shaft carrying the blade and having a wind-skew position to it, a rotating hollow spoke, carrying the blade shaft in a wind-skew position to the plane of rotation of the hollow spoke, a rotating main shaft rigidly carrying at a right angle the hollow spoke, a controlling shaft rotatably and axially mounted in the interior of the hollow-spoke, a hollow axle surrounding and supporting the main shaft at its one end, a hollow rotatable controlling bush, surrounding the hollow axle and forming a further support of the hollow spoke, bevel gears mounted on the controlling bush, the controlling shaft and the blade shaft respectively for rotating the latter, means for operating the main shaft together with the spoke and means for tightening and imparting an additional rotative motion respectively to the controlling bush, and means for operating the controlling bush from the driver of the vehicle.

LUDWIG NETTER.